United States Patent
Kano (10) Patent No.: US 10,469,730 B2
(45) Date of Patent: Nov. 5, 2019

(54) IMAGING DEVICE AND CONTROL METHOD FOR SIMULTANEOUSLY OUTPUTTING AN IMAGE PICKUP SIGNAL AND A PARALLAX IMAGE SIGNAL

(71) Applicant: CANON KABUSHIKI KAISHA, Tokyo (JP)

(72) Inventor: Masaaki Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 15/591,701

(22) Filed: May 10, 2017

(65) Prior Publication Data

US 2017/0339332 A1 Nov. 23, 2017

(30) Foreign Application Priority Data

May 18, 2016 (JP) .................................. 2016-099186
Feb. 28, 2017 (JP) .................................. 2017-036568

(51) Int. Cl.
*H04N 5/232* (2006.01)
*H04N 5/369* (2011.01)
*G02B 7/34* (2006.01)

(52) U.S. Cl.
CPC ..... *H04N 5/23212* (2013.01); *H04N 5/23219* (2013.01); *H04N 5/3696* (2013.01); *G02B 7/34* (2013.01)

(58) Field of Classification Search
CPC .................. H04N 5/23212; H04N 5/23219
USPC ....................................................... 348/350
See application file for complete search history.

(56) References Cited

U.S. PATENT DOCUMENTS

| | | | | |
|---|---|---|---|---|
| 2013/0222553 A1* | 8/2013 | Tsuchita | ............ | H01L 27/14627 348/49 |
| 2013/0265397 A1* | 10/2013 | Matsuda | .................. | G03C 9/00 348/51 |
| 2013/0266209 A1* | 10/2013 | Matsuda | .............. | H04N 13/128 382/154 |
| 2014/0210955 A1* | 7/2014 | Fujita | ..................... | G03B 35/08 348/50 |
| 2014/0210962 A1* | 7/2014 | Tsuchita | ............... | H04N 13/128 348/54 |
| 2015/0195503 A1* | 7/2015 | Miyazaki | ............. | H04N 13/232 348/49 |

FOREIGN PATENT DOCUMENTS

JP 2014-137567 A 7/2014

* cited by examiner

*Primary Examiner* — Usman A Khan
(74) *Attorney, Agent, or Firm* — Cowan, Liebowitz & Latman, P.C.

(57) ABSTRACT

An imaging device including an imaging element configured to output an image pickup signal and a parallax image signal is provided. The imaging device selects a subject area on the basis of the image pickup signal and performs a control to read the parallax image signal from a reading area of the imaging element corresponding to the selected subject area. In this control, the imaging device selects a subject area on the basis of a result of comparing the number of lines configuring the reading area corresponding to the subject area and a threshold value.

9 Claims, 12 Drawing Sheets

IMAGING DEVICE AND CONTROL METHOD FOR SIMULTANEOUSLY OUTPUTTING AN IMAGE PICKUP SIGNAL AND A PARALLAX IMAGE SIGNAL

BACKGROUND OF THE INVENTION

Field of the Invention

The present invention relates to an imaging device and a control method.

Description of the Related Art

As the number of pixels in television broadcasting has recently increased, an imaging device in which the number of pixels has increased to 4K or 8K has been proposed. In addition, an imaging device in which there has been progress to a high frame rate to display a subject in a smooth manner has also been proposed.

As the resolution of imaging devices has increased, an improvement of focusing precision of a lens and speeding-up of a focusing operation have been required. Therefore, in order to realize speeding-up of a focusing operation and improvement of focusing precision of an imaging device, an imaging device which includes an imaging element capable of acquiring a parallax image signal, that is, an image signal for acquiring phase difference information, and an image pickup signal at the same time has been proposed. Japanese Patent Laid-Open No. 2014-137567 discloses an imaging device which includes an imaging element having a focus detection pixel configured to output a signal used for calculation of a defocus amount and an imaging pixel.

The imaging device disclosed in Japanese Patent Laid-Open No. 2014-137567 reads signals from the focus detection pixel and the imaging pixel at the same time, and thus has an increased reading band of a signal from the imaging element. If the reading band of a signal from the imaging element (the number of vertical lines) exceeds the reference number of lines, reading malfunction occurs. In addition, if the number of terminals for outputting a signal increases according to an increase in the reading band, a package of the imaging element becomes larger and power consumption increases.

SUMMARY OF THE INVENTION

The present invention provides an imaging device which includes an imaging element configured to output a parallax image signal and an image pickup signal and is capable of preventing reading malfunction caused by an excess of the reading band of signals from the imaging element.

An imaging device according to a first embodiment of the present invention includes an imaging element configured to output an image pickup signal and a parallax image signal, and a control unit configured to select a subject area on the basis of the image pickup signal and to perform a control to read the parallax image signal from a reading area of the imaging element corresponding to the selected subject area. The control unit selects a subject area on the basis of a result of comparing the number of lines configuring the reading area corresponding to the subject area and a threshold value.

Further features of the present invention will become apparent from the following description of exemplary embodiments with reference to the attached drawings.

DESCRIPTION OF THE EMBODIMENTS

An imaging device which specifies a reading area of an imaging element corresponding to a subject (for example, face) detected in a photographed image and reads a parallax image signal from the reading area will be considered. However, if there are a plurality of areas of the detected subject (subject areas), there is a possibility that a reading band may increase and reading malfunction may occur.

First Embodiment

Figure 1:
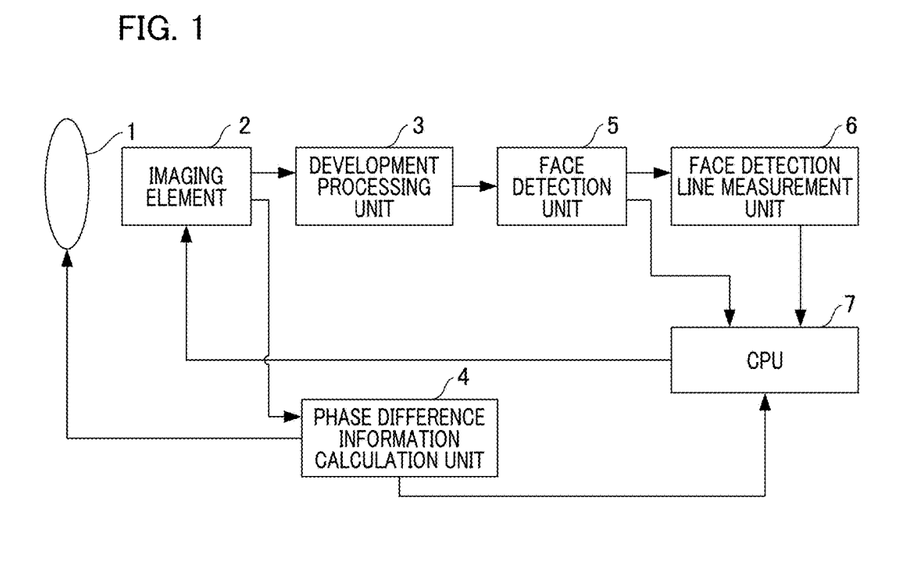
FIG. 1 is a diagram which shows a configuration example of an imaging device according to the present embodiment.

FIG. 1 is a diagram which shows a configuration example of an imaging device according to the present embodiment.

An imaging device shown in FIG. 1 includes a lens 1 to a CPU 7.

The lens 1 configures an imaging unit for imaging a subject. An imaging element 2 converts an optical signal from the lens 1 into an electrical signal. The imaging element 2 has pixels which are capable of reading an image area for acquiring a phase difference and arranged on X-Y addresses. The image area for acquiring a phase difference is a reading area for reading a parallax image to be described below.

The imaging element 2 is configured from one microlens and two photodiodes for a color filter. A signal (image pickup signal) obtained by adding signals from the two photodiodes and an output signal (parallax image signal) from one of the two photodiodes are output from the imaging element 2 at the same time. In the following description, an image related to the image pickup signal is described as a captured image, and an image related to the parallax image signal is described as a parallax image.

A development processing unit 3 develops a captured image output from the imaging element 2. A face detection unit 5 extracts a face area from the developed captured image. A face detection line measurement unit 6 measures the number of vertical lines in the extracted face area on the basis of an output signal from the face detection unit 5.

A central processing unit (CPU) 7 controls an entire imaging device. The output signal from the face detection unit 5 and an output signal from the face detection line measurement unit 6 are input to the CPU 7. The CPU 7 sets a priority of a face detection frame on the basis of a reference number of lines and the output signal from the face detection unit 5. The reference number of lines is a number of vertical lines which is a predetermined reference. The CPU 7 sets an image area for acquiring phase difference information according to the prioritized face detection frame.

Figure 12:
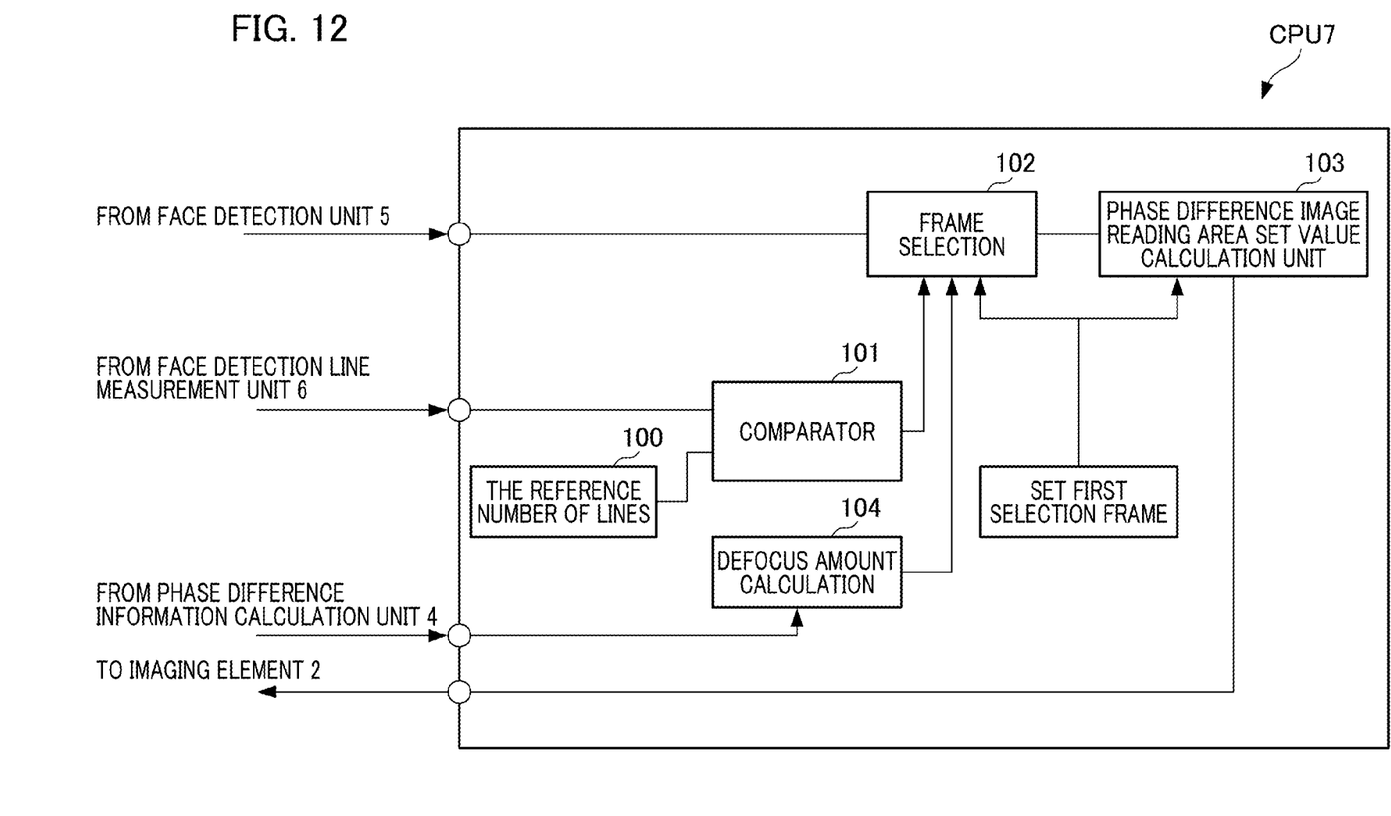
FIG. 12 is a diagram which shows a configuration example of a CPU provided in the imaging device.

Here, an internal operation of the CPU 7 will be described with reference to FIG. 12. FIG. 12 is a diagram which shows a configuration example of a CPU provided in the imaging device.

The output signal from the face detection unit 5 and the output signal from the face detection line measurement unit 6 are input to the CPU 7. The output signal from the face detection line measurement unit 6 is input to a comparator 101. On the other hand, information on a threshold value for a total number of lines of an image for acquiring phase difference information from the imaging element 2 (the reference number of lines) is input to the comparator 101 according to the predetermined reference number of lines 100. The comparator 101 determines whether the total number of lines of an image for acquiring phase difference information corresponding to a current face detection frame is equal to or greater than, or equal to or less than the reference number of lines, and outputs information of a frame selection 102 based on the two input signals.

Frame information from the face detection unit 5 is input to the frame selection 102. Moreover, information on a signal output from a phase difference information calculation unit 4 via a defocus amount calculation 104 for calculating a defocus amount of each face detection frame is input to the frame selection 102. Furthermore, information of a frame set as a first selection frame among a plurality of detected face detection frames is also input to the frame selection 102. The frame selection 102 outputs priority information for the plurality of detected face detection frames and area information of an image for acquiring phase difference information corresponding to a face detection frame to be read within one frame to a phase difference image reading area set value calculation unit 103 among the four types of information which have been input. The phase difference image reading area set value calculation unit 103 calculates a reading set value for the imaging element 2 and outputs it to the imaging element 2.

The phase difference information calculation unit 4 generates the other parallax image (R) based on a captured image (R+L) and a parallax image (L). The phase difference information calculation unit 4 calculates phase difference information on the basis of the parallax image (L) and the parallax image (R).

Figure 2A:
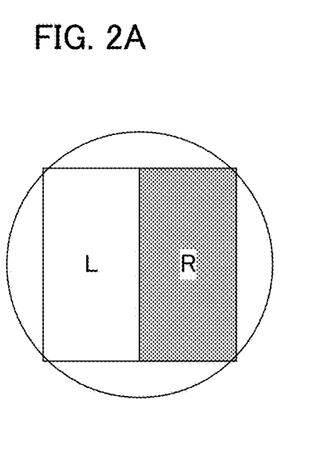
FIGS. 2A and 2B are diagrams which show an example of a configuration of an imaging element.
Figure 2B:
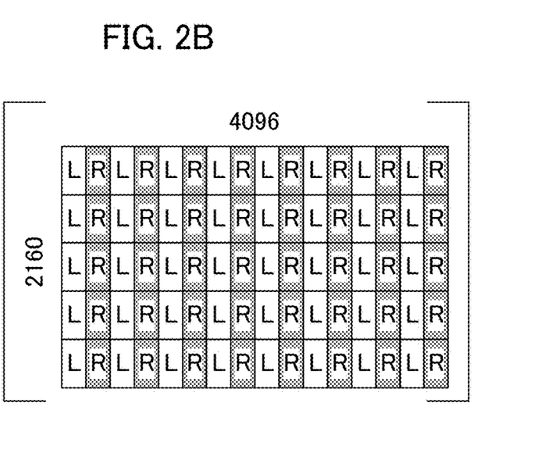

FIG. 2 is a diagram which shows an example of a configuration of the imaging element.

The imaging element 2 includes, as shown in FIGS. 2A and 2B, one microlens, and two photodiodes for a color filter which configure one pixel. The pixel is arranged on an X-Y address. The imaging element 2 configured from each of pixels outputs a captured image obtained by adding output signals from the two photodiodes and a parallax image L that is an output signal from one of the two photodiodes as a RAW image at the same time. The imaging element 2 outputs the captured image to the development processing unit 3. In addition, the imaging element 2 outputs the captured image and the parallax image to the phase difference information calculation unit 4.

The development processing unit 3 performs development processing such as interpolation processing and color correction processing of each pixel on the RAW image that is the input captured image to generate a developed image (YUV image). The development processing unit 3 outputs the developed image to the face detection unit 5.

The phase difference information calculation unit 4 generates a parallax image (R) by subtracting the parallax image (L) from the input captured image. The phase difference information calculation unit 4 calculates phase difference information by comparing the parallax image (L) and the parallax image (R). The calculated phase difference information can be used as, for example, a focusing signal, and focusing can be performed by transmitting a control signal to a focusing unit provided in the lens 1.

The face detection unit 5 determines whether there is a face in the YUV image input from the development processing unit 3, and if there is a face, the face detection unit 5 sets an area corresponding to the face as a face area and outputs the face area to the face detection line measurement unit 6. In addition, the face detection unit 5 outputs positional information of the face area in a vertical direction to the CPU 7.

The face detection line measurement unit 6 measures the number of vertical lines Lf from the input information of the face area. The face detection line measurement unit 6 outputs information on the number of vertical lines Lf to the CPU 7. In addition, if there are a plurality of face areas detected by the face detection unit 5, the face detection unit 5 outputs information on all the face detection frames to the face detection line measurement unit 6. Then, the face detection line measurement unit 6 outputs information on the number of vertical lines Lf (1 to N) of areas corresponding to respective face detection frames to the CPU 7.

The CPU 7 controls the entire imaging device. The positional information of the face area in a vertical direction is input to the CPU 7 from the face detection unit 5. In addition, the information on the number of vertical lines Lf (1 to N) of the plurality of face areas is input to the CPU 7 from the face detection line measurement unit 6. The CPU 7 calculates a total value LfS of Lf (1 to N). Moreover, the CPU 7 includes the reference number of lines Lc for comparison with the total number of vertical lines LfS of face areas.

In addition, the CPU 7 sets a main face as a first selection frame which is a selection frame with a highest priority among the plurality of input face areas (positions and sizes of faces), and calculates a focal position of the first selection frame and focal positions of other frames. The CPU 7 sets a face area whose focal position is closest to the first selection frame as a second selection frame which is a selection frame with a second priority, and sets a face area whose focal position is next closest as a third selection frame which is a selection frame with a third priority. The main face can also be arbitrarily set by a user.

Figure 10:
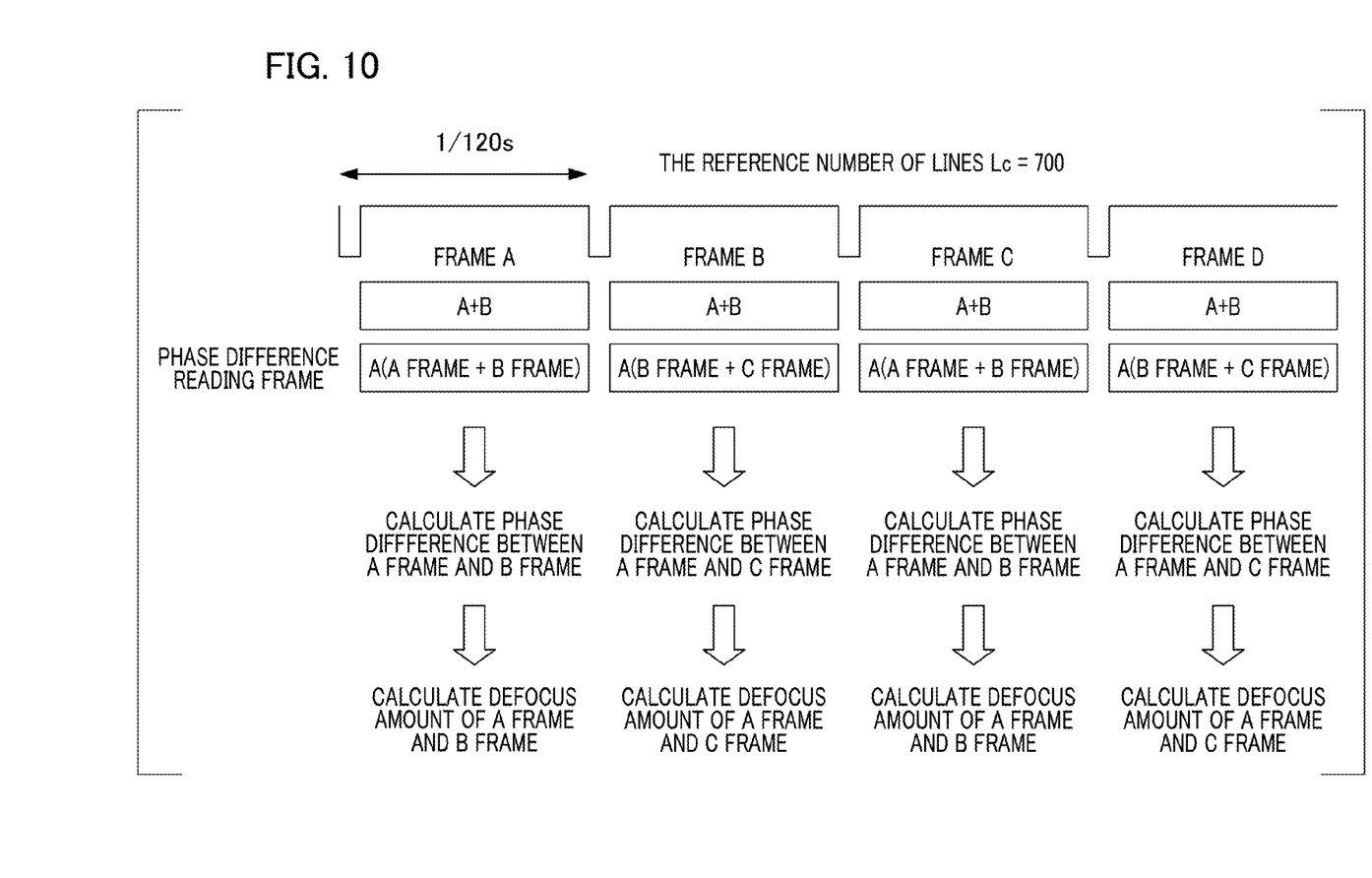
FIG. 10 is a diagram which describes a method for calculating focal positions of a first selection frame and other frames of an image for acquiring phase difference information.

Here, a method of calculating a focal position of each frame will be described with reference to FIG. 10. FIG. 10 is a diagram which describes a method for calculating a focal position of the first selection frame and focal positions of other frames of an image for acquiring phase difference information.

Figure 4A:
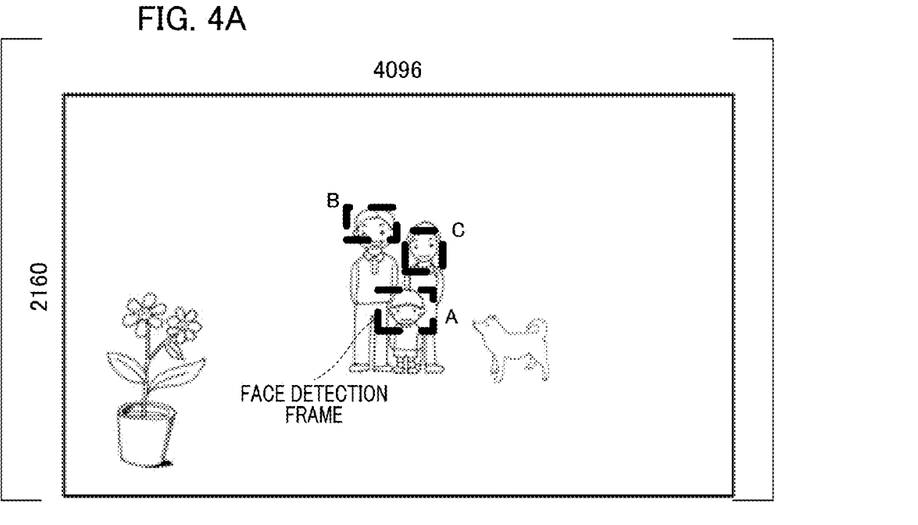
FIGS. 4A and 4B are diagrams which show the setting of an image area for acquiring phase difference information.
Figure 4B:
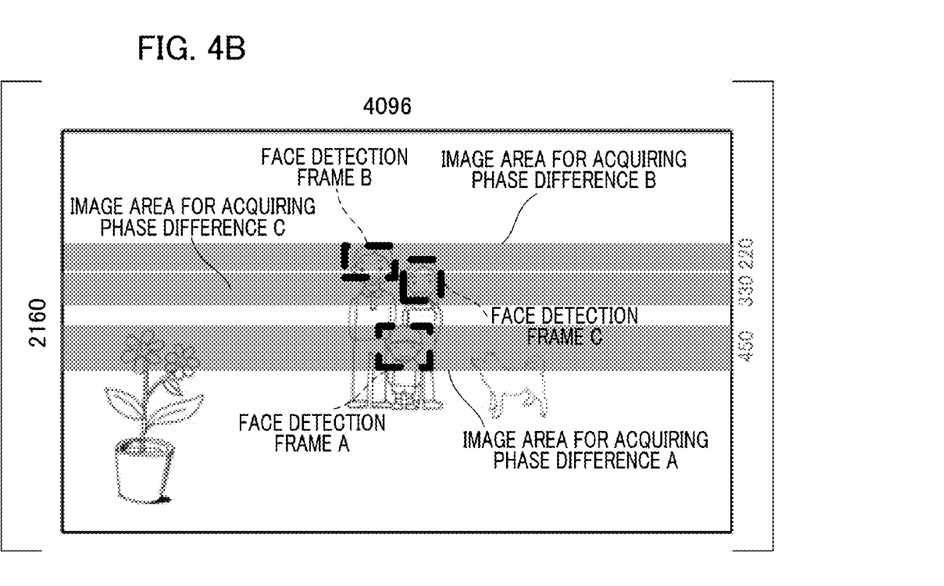

Reading images for acquiring phase difference information of respective frames from the imaging element 2 is performed by switching between image areas for acquiring phase difference information of respective frames at each time to read frames A to D in a time division manner. In FIG. 10, the maximum number of lines for reading an image area for acquiring phase difference information from the imaging element 2 is set to 700, and areas corresponding to respective face detection frames include, as shown in FIG. 4, 450 for a face detection frame A, 330 for a face detection frame B, and 220 for a face detection frame C.

In addition, the first selection frame is set as the face detection frame A.

For this reason, firstly in a time of the frame A, A frame and B frame are read as an image area for acquiring phase difference information.

Next, in a time of the frame B, A frame and C frame are read as an image area for acquiring phase difference information.

Next, in a time of the frame C, A frame and B frame are read as an image area for acquiring phase difference information.

Next, in a time of the frame D, A frame and C frame are read as an image area for acquiring phase difference information.

Next, a phase difference of each frame is calculated based on each image area for acquiring phase difference information which has been read in each frame to calculate a defocus amount of each frame.

Then, frames having focal positions close to the first selection frame A are determined and are set as a second selection frame and a third selection frame based on a result of the defocus amount calculation.

The CPU 7 compares the total number of vertical lines LfS of face areas and the reference number of lines Lc which is a threshold value, and selects a face area (subject area) corresponding to an image area for acquiring phase difference information on the basis of a result of the comparison. Specifically, the CPU 7 executes the following processing if the total number of vertical lines LfS of face areas is equal to or less than the reference number of lines Lc (LfS≤Lc). The CPU 7 selects all face areas that have been input, and sets areas corresponding to the face areas as image areas for acquiring phase difference information in the imaging element 2.

In addition, the CPU 7 executes the following processing if the total number of vertical lines of face areas LfS is greater than the reference number of lines Lc (LfS>Lc). The CPU 7 sets an area corresponding to the first selection frame as an image area for acquiring phase difference information.

In addition, the CPU 7 executes the following processing if the number of vertical lines Lf1 of the first selection frame is equal to or less than the reference number of lines Lc (Lf1≤Lc). The CPU 7 sets the second selection frame as a selection candidate. Moreover, if a total of the number of vertical lines Lf1 of the first selection frame and the number of vertical lines Lf2 of the second selection frame is equal to or less than the reference number of lines Lc, the CPU 7 executes the following processing. The CPU 7 selects the first selection frame and the second selection frame, and sets areas corresponding to these selection frames as an image reading area for acquiring phase difference information.

Furthermore, if a total of the number of vertical lines Lf1 of the first selection frame, the number of vertical lines Lf2 of the second selection frame, and the number of vertical lines Lf3 of the third selection frame is equal to or less than the reference number of lines Lc, the CPU 7 executes the following processing. The CPU 7 sets the image reading area for acquiring phase difference information to include an area corresponding to the third selection frame. As described above, the CPU 7 sets an area corresponding to a selection frame as the image reading area for acquiring phase difference information in accordance with priority so that the total number of vertical lines of selection frames does not exceed the reference number of lines Lc.

Figure 3A:
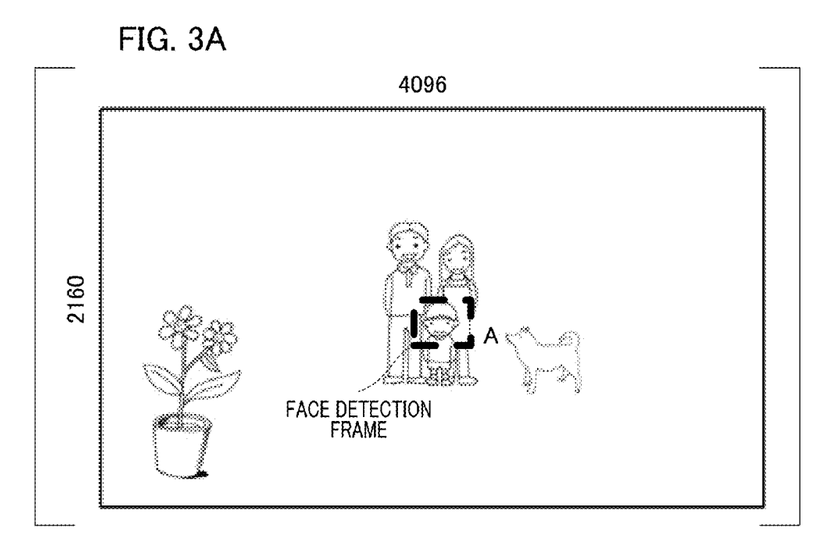
FIGS. 3A and 3B are diagrams which show a setting of an image area for acquiring phase difference information.
Figure 3B:
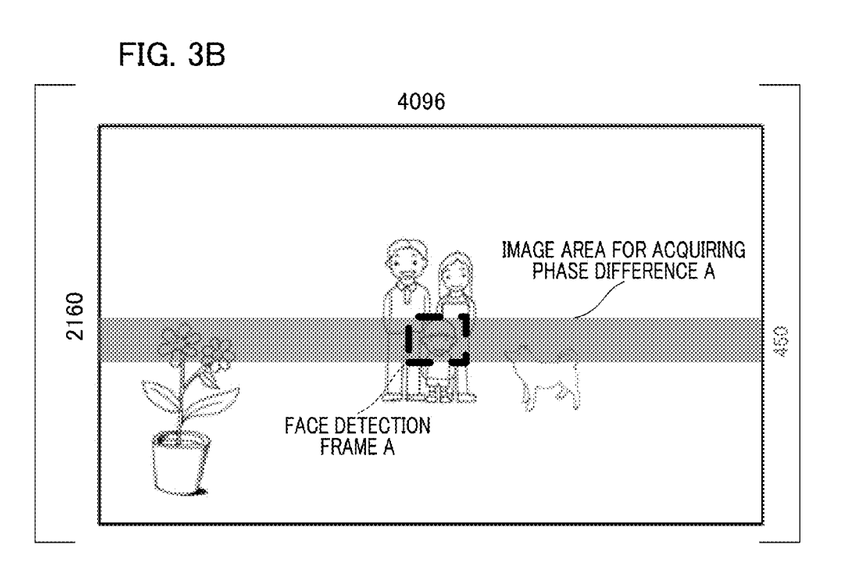

FIGS. 3 and 4 are diagrams which describe a setting of an image area for acquiring phase difference information.

FIG. 3A shows a captured image. An image size of the captured image is 4K*2K (4096 pixels*2160 lines). A face detection frame A is shown in the captured image shown in FIG. 3A. The reference number of lines Lc provided in the CPU 7 is set to 700 lines.

In an example shown in FIG. 3A, an area corresponding to a face detection frame A is a candidate set as an image area for acquiring phase difference information A. FIG. 3B is a diagram which shows the image area for acquiring phase difference information A. Information on the number of vertical lines Lf of the image area for acquiring phase difference information A is 450 lines.

In examples shown in FIGS. 3A and 3B, since there is one face detection frame and LfS is 450, LfS is less than Lc (Lfs<Lc). As a result, the image area for acquiring phase difference information set in the imaging element 2 is only the image area for acquiring phase difference information A corresponding to the face detection frame A.

In an example shown in FIG. 4A, there are three face detection frames which are face detection frames A, B, and C in a photographed image. In this example, as shown in FIG. 4B, image areas for acquiring phase difference information A, B, and C corresponding to each of the face detection frames A, B, and C are candidates for the image area for acquiring phase difference information which is set. Information LfA, LfB, and LfC on the number of vertical lines of each of the image areas for acquiring phase difference information A, B, and C are 450 lines, 220 lines, and 330 lines, respectively.

In examples shown in FIGS. 4A and 4B, since there are three face detection frames, LfS which is obtained by adding LfA, LfB, and LfC is 1000. As a result, LfS is greater than Lc (LfS>Lc) and exceeds a reference value. For this reason, it is not possible to read all the image areas for acquiring phase difference information from the imaging element 2.

Figure 5:
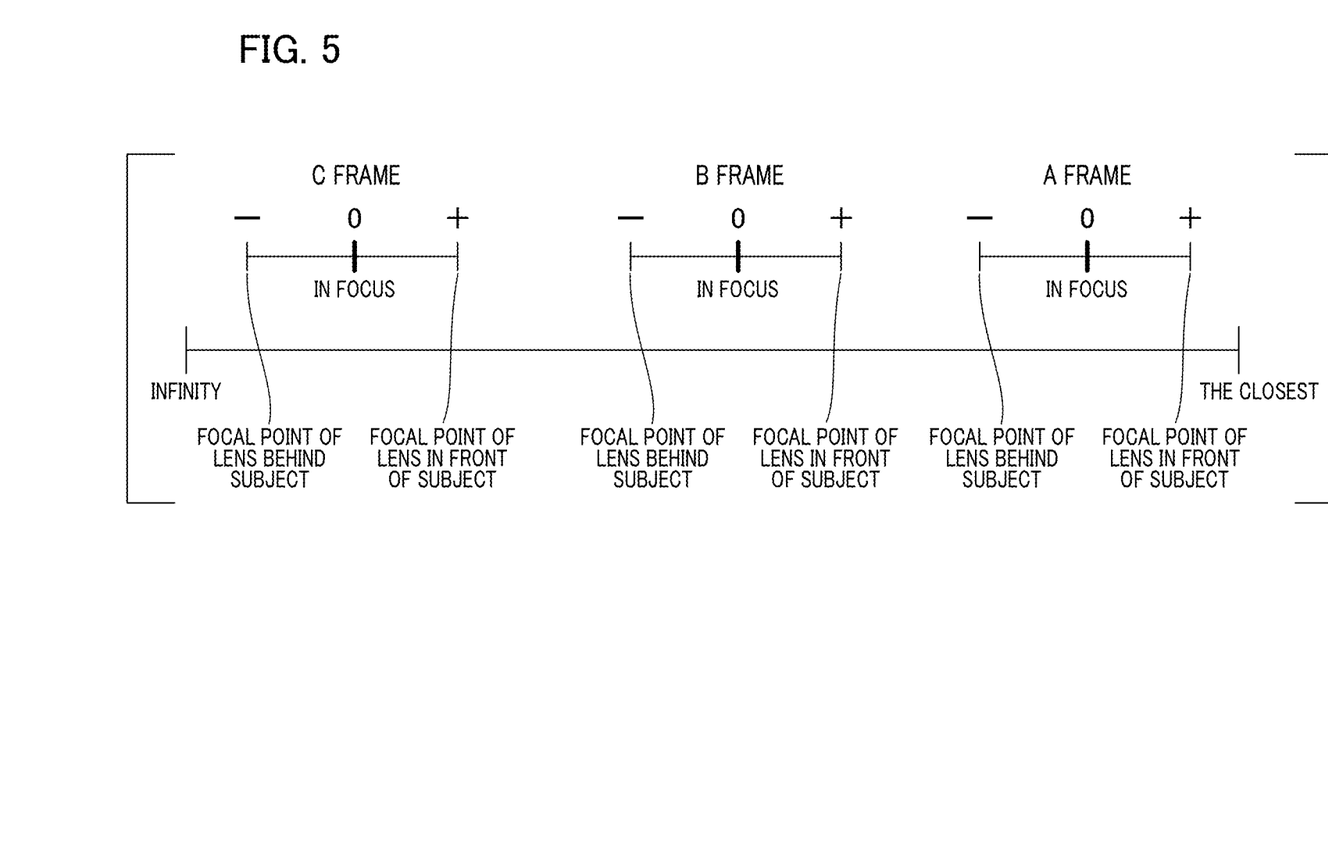
FIG. 5 is a diagram which shows a relationship between an in-focus position and a focal position of a face detection frame.

FIG. 5 is a diagram which shows relationships between in-focus positions and focal positions of a plurality of face detection frames shown in FIG. 4.

The face detection frame A, the face detection frame B, and the face detection frame C are arranged in this order from the closest focal position toward an infinity focal position. It is known that a focal position of the face detection frame A is the closest to a focal position of the face detection frame B in FIG. 5.

Figure 6A:
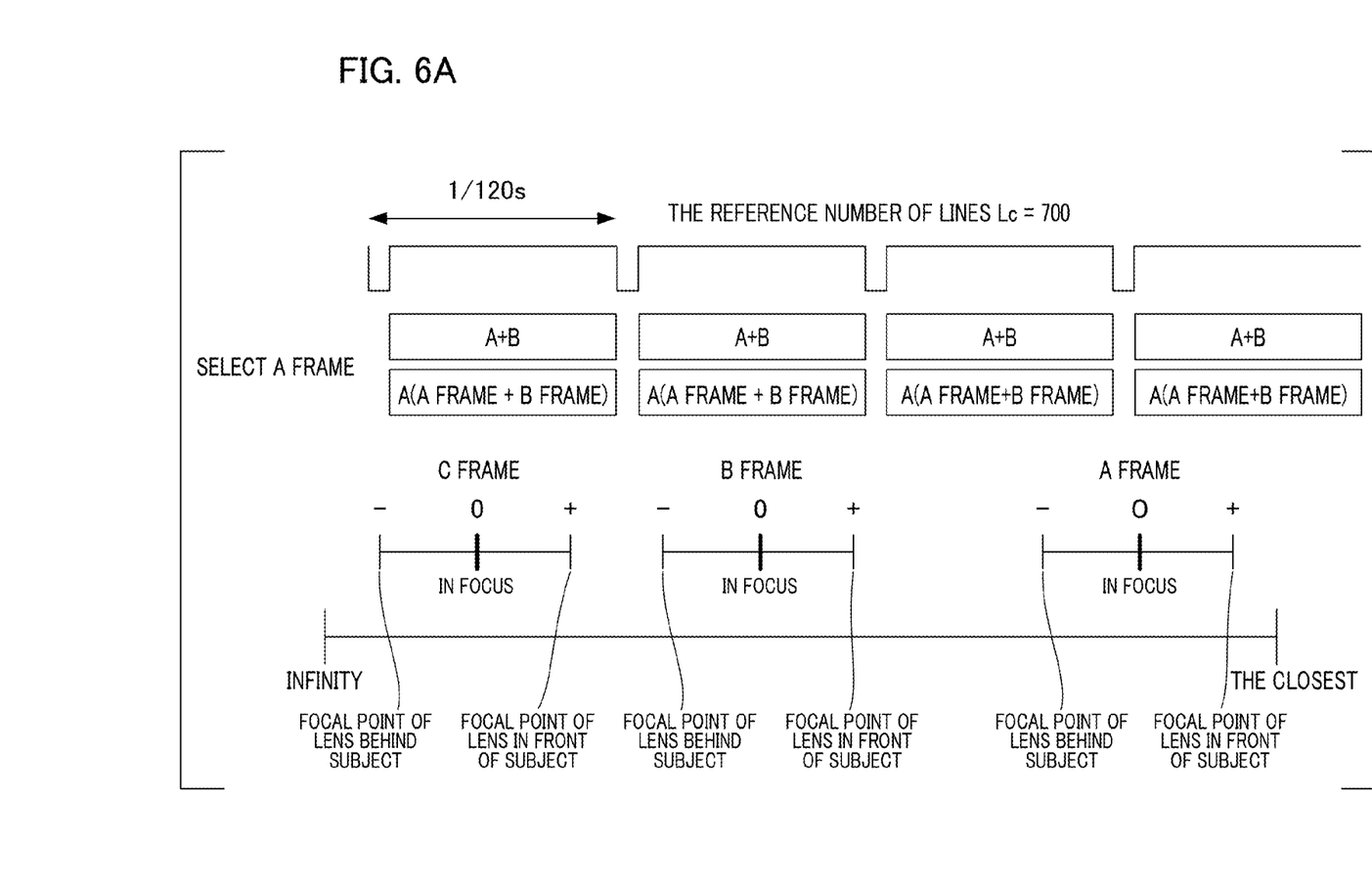
FIGS. 6A and 6B are diagrams which describe the setting of an image area for acquiring phase difference information in the first embodiment.
Figure 6B:
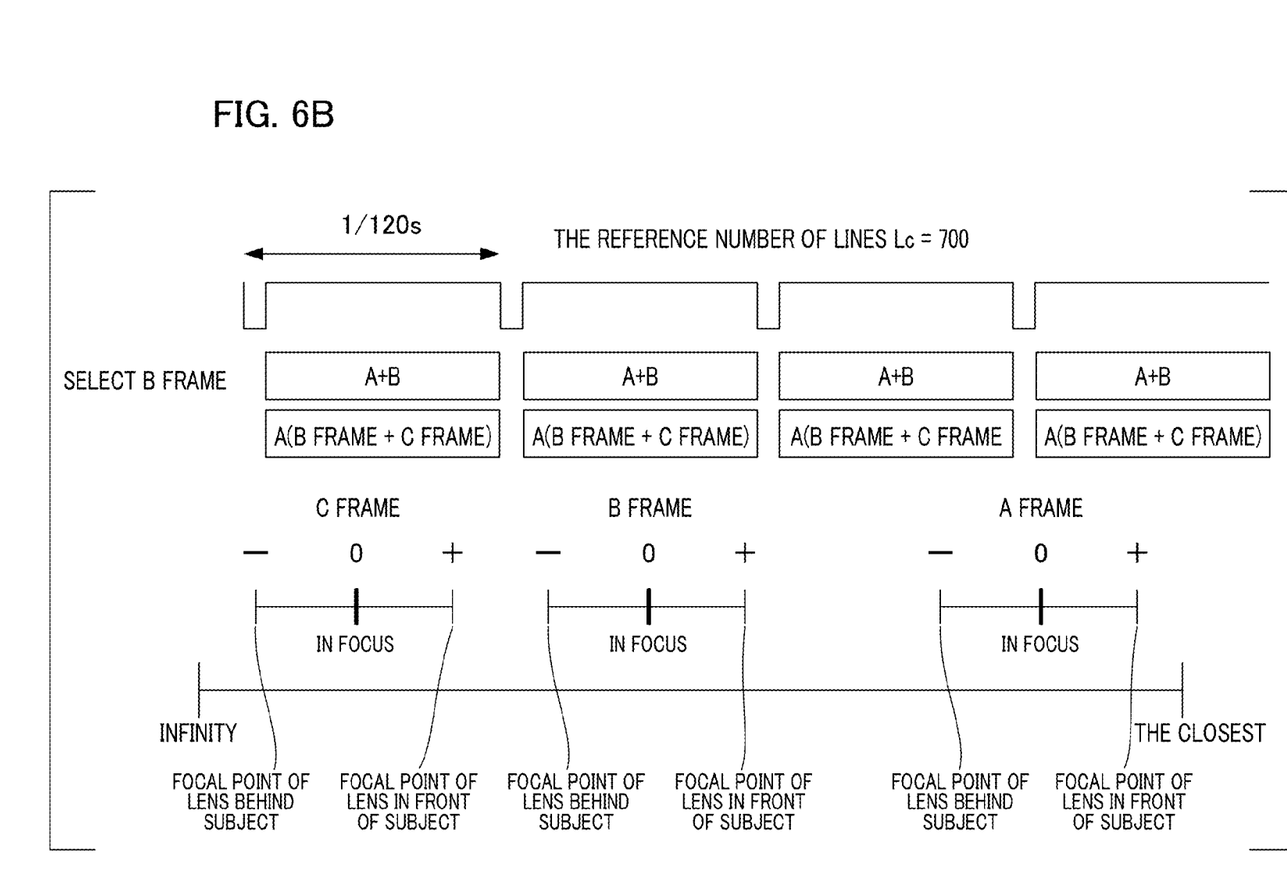

FIG. 6 is a diagram which describes the setting of the image area for acquiring phase difference information in the first embodiment.

As shown in FIG. 4B, there are three face detection frames in the photographed image and the reference number of lines Lc is set to 700. FIG. 6A shows the setting of the image area for acquiring phase difference information if the face detection frame A is specified as the first selection frame which is a selection frame with a highest priority among the three face detection frames.

The information on the number of vertical lines Lf corresponding to the face detection frame A (=LfA) is 450, and the reference number of lines Lc is 700. Therefore, if the vertical lines corresponding to the face detection frame A are set as the image area for acquiring phase difference information and read, there is still a portion of 250 lines left over with respect to the reference number of lines Lc.

Therefore, the face detection frame B which is a frame whose focal position is the closest to a focal position of the first selection frame, that is, the face detection frame A, is set as a candidate for the second selection frame. In this case, the information on the number of vertical lines is in a following state.

The information on the number of vertical lines Lf=LfA+LfB=450+220=670

The reference number of lines Lc=700

In this state, even if the vertical lines corresponding to the face detection frame A and the vertical lines corresponding to the face detection frame B are set as the image area for acquiring phase difference information and read with respect to the reference number of lines Lc, there is still a portion of 30 vertical lines left over with respect to the reference number of lines Lc.

Next, the face detection frame C which is a frame whose focal position is closest to the focal position of the face detection frame A next to the face detection frame B is set as a candidate for the third selection frame. In this case, information on the number of vertical lines is in a following state.

Information on the number of vertical lines Lf=LfA+LfB+LfC=450+220+330=1000

The reference number of lines Lc=700

In this state, reading up to the third selection frame causes the total number of vertical lines Lf to exceed the reference number of lines Lc. Therefore, if the first selection frame is set as the face detection frame A, the image area for acquiring phase difference information read from the imaging element 2 is the image area for acquiring phase difference information corresponding to the face detection frame A and the face detection frame B.

In an example shown in FIG. 6B, it may be assumed that the face detection frame B is specified as the first selection frame among the three face detection frames.

When the face detection frame B is selected as the first selection frame, the information on the number of vertical lines Lf=LfB is 220. In addition, the reference number of lines Lc is 700.

In this state, if the vertical lines corresponding to the face detection frame B are set as the image area for acquiring phase difference information and read, there is still a portion of 480 vertical lines left over with respect to the reference number of lines Lc. Therefore, the face detection frame C which is a frame whose focal position is the closest to a focal position of the first selection frame, that is, the face detection frame B, is set as a candidate for the second selection frame. In this case, information on the number of vertical lines is in a following state.

The information on the number of vertical lines Lf=LfB+LfC=220+330=550

The reference number of lines Lc=700

In this state, even if the vertical lines corresponding to the face detection frame B and the vertical lines corresponding to the face detection frame C are set as the image area for acquiring phase difference information and read, there is still a portion of 150 vertical lines left over with respect to the reference number of lines Lc.

Next, if the face detection frame C is set as a candidate for the third selection frame, the number of vertical lines of the face detection frame A is 450 lines, and thus reading up to the third selection frame causes the total number of vertical lines to exceed the reference number of lines Lc. Therefore, if the first selection frame is set as the face detection frame B, the image area for acquiring phase difference information read from the imaging element 2 is an image area for acquiring phase difference information corresponding to the face detection frame B and the face detection frame C. As described above, if there are a plurality of face detection frames in a photographed image, the reference number of lines set in advance is compared with the number of vertical lines of the first selection frame, and if there is a surplus, the number of candidates for set frames such as the second selection frame and the third selection frame is increased. Then, the image area for acquiring phase difference information is set so that a total of the number of vertical lines of the candidates for set frames does not exceed the reference number of lines. That is, the CPU 7 sets a face detection frame of a main subject to have a highest priority and sets a face detection frame closer to a focal position of the main subject to have a higher priority. Then, face detection frames corresponding to the image area for acquiring phase difference information are selected in a descending order of priority so that the total number of vertical lines corresponding to a selected subject area does not exceed the reference number of lines Lc.

Figure 7:
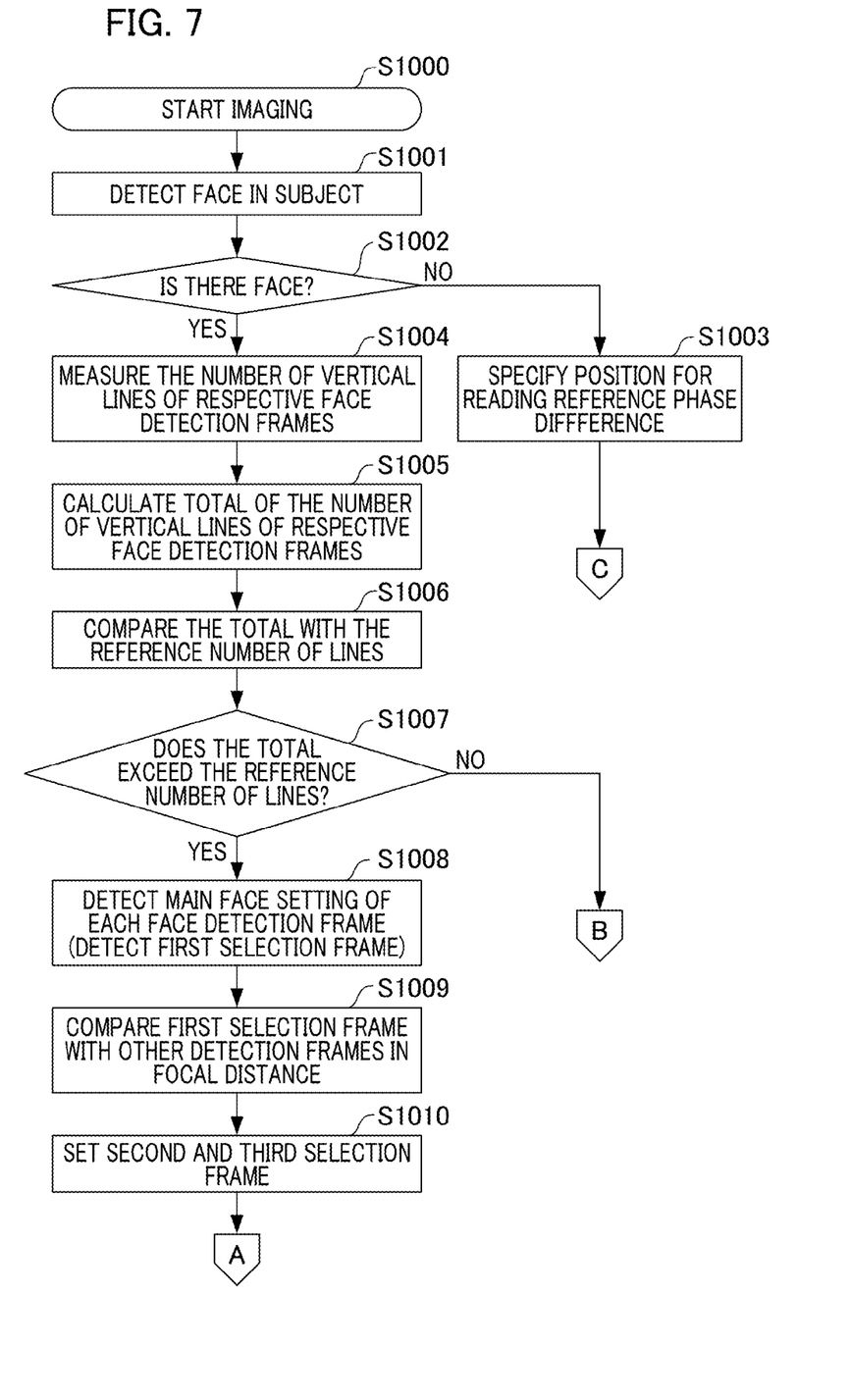
FIG. 7 is a flowchart which describes processing of setting an image area for acquiring phase difference information.
Figure 8:
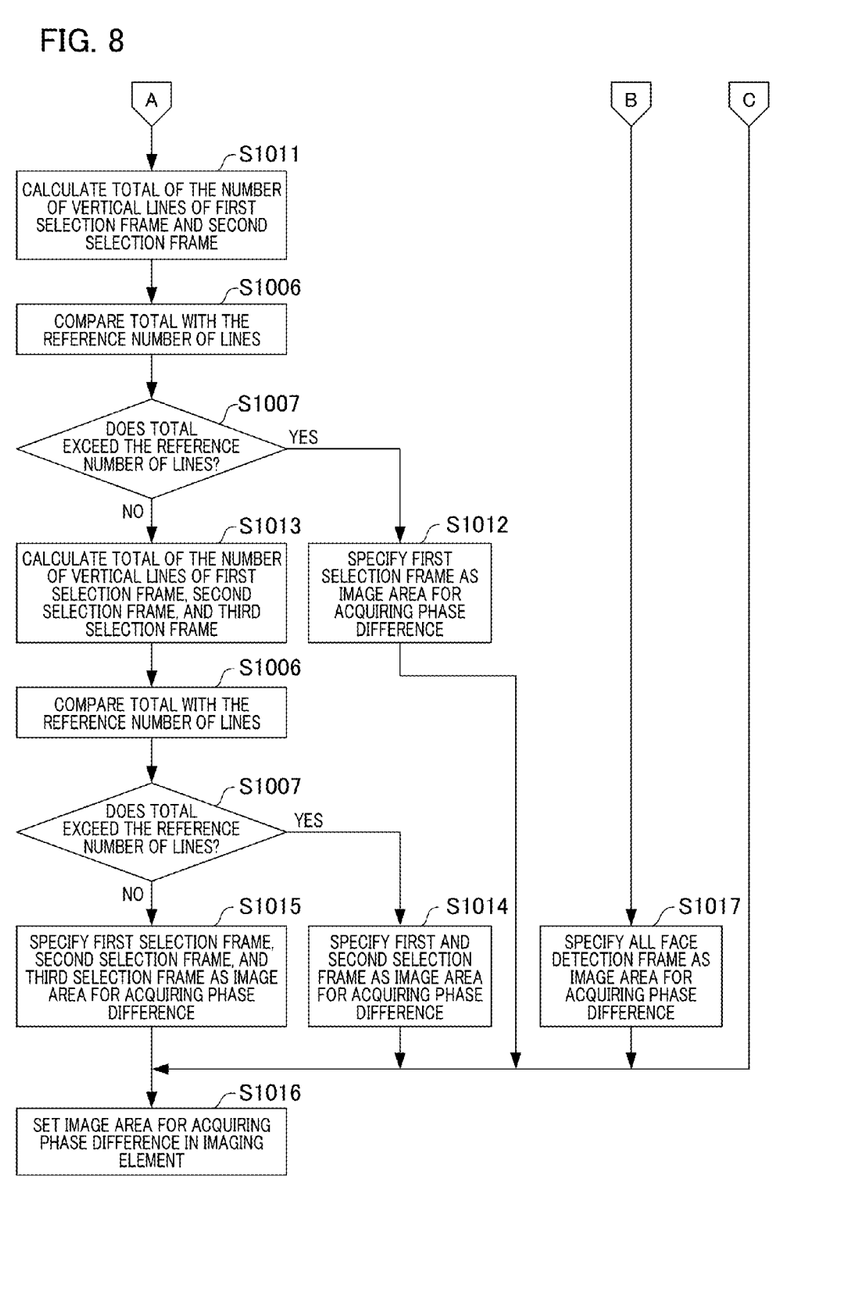
FIG. 8 is a flowchart which describes the processing of setting an image area for acquiring phase difference information.

FIGS. 7 and 8 are flowcharts which describe processing of setting the image area for acquiring phase difference information.

In S1000, the CPU 7 starts reading from the imaging element 2 and outputs an image for acquiring phase difference information and a photographed image at the same time. In S1001, the face detection unit 5 performs extraction of a face area (face detection) from a YUV image obtained by performing development processing on a RAW image for the photographed image output from the imaging element 2.

Next, in S1002, the CPU 7 determines whether there is a face in the photographed image based on a result of the face detection. If there is no face in the photographed image, processing proceeds to S1003. In S1003, the CPU 7 specifies a position for reading a reference phase difference stored in a storage unit in advance as an image area for acquiring phase difference information. Then, the processing proceeds to S1016 of FIG. 8 and the CPU 7 sets the image area for acquiring phase difference information in the imaging element 2.

If there is a face in the photographed image, the CPU 7 sets a frame of the detected face (face detection frame). The processing proceeds to S1004. In S1004, the face detection line measurement unit 6 measures the number of vertical lines corresponding to respective face detection frames. Subsequently, in S1005, the CPU 7 calculates a total of the numbers of vertical lines corresponding to respective face detection frames, which have been measured. In S1006, the CPU 7 compares the total of the number of vertical lines with the reference number of lines stored in the storage unit in advance.

In S1007, the CPU 7 determines whether the total of the number of vertical lines exceeds the reference number of lines. If the total of the number of vertical lines does not exceed the reference number of lines, the processing proceeds to S1017 of FIG. 8. Then, in S1017, the CPU 7 specifies an area of vertical lines corresponding to all the extracted face detection frames as an image area for acquiring phase difference information, and the processing proceeds to S1016. Then, in S1016, the CPU 7 sets data in a timing generator provided in the imaging element 2 to read an image from the image area for acquiring phase difference information set in the imaging element.

If the total of the number of vertical lines exceeds the reference number of lines, the processing proceeds to S1008.

In S1008, the CPU 7 detects which face detection frame is set as a main face among the face detection frames. The CPU 7 sets the face detection frame set as a main face as the first selection frame. Subsequently, in S1009, the CPU 7 calculates focal positions of respective face detection frames and compares the focal positions of the first selection frame and other selection frames. In S1010, the CPU 7 sets a second selection frame and a third selection frame among the face detection frames other than the first selection frame on the basis of a result of the comparison processing in S1009.

In S1011 of FIG. 8, the CPU 7 calculates the number of vertical lines corresponding to the first selection frame and the second selection frame which have been set and calculates a total of the number of vertical lines. Subsequently, in S1006, the CPU 7 compares the total of the number of vertical lines calculated in S1011 with the reference number of lines.

Next, in S1007, the CPU 7 determines whether the total of the number of vertical lines exceeds the reference number of lines on the basis of a result of the comparison in S1016. If the total of the number of vertical lines exceeds the reference number of lines, the processing proceeds to S1012. In S1012, the CPU 7 specifies an area corresponding to the first selection frame as an image area for acquiring phase difference information. Then, in S1016, the CPU 7 sets data in the timing generator provided in the imaging element.

If the total of the number of vertical lines does not exceed the reference number of lines, the processing proceeds to S1013. In S1013, the CPU 7 calculates a total of the number of vertical lines of the first selection frame, the second selection frame, and the third selection frame. In S1006, the CPU 7 compares the total of the number of vertical lines with the reference number of lines.

Next, the CPU 7 determines whether the total of the number of vertical lines exceeds the reference number of lines. If the total of the number of vertical lines exceeds the reference number of lines, the processing proceeds to S1014. In S1014, the CPU 7 specifies an area corresponding to the first selection frame and the second selection frame as an image area for acquiring phase difference information. Then, in S1016, the CPU 7 sets data in the timing generator provided in the imaging element.

If the total of the number of vertical lines does not exceed the reference number of lines, the processing proceeds to S1015. In S1015, the CPU 7 specifies an area corresponding to each of the first selection frame, the second selection frame, and the third selection frame as an image area for acquiring phase difference information. Then, in S1016, the CPU 7 sets data in the timing generator provided in the imaging element. By the above processing, even if there are a plurality of face detection frames in a photographed image, it is possible to control which frame to specify as an image area for acquiring phase difference information according to priority settings of the face detection frames. Accordingly, it is possible to prevent poor reading due to an excess of reading band of an imaging element.

Second Embodiment

The imaging device of the second embodiment reads a plurality of image areas for acquiring phase difference information in conjunction with the plurality of face detection frames in the photographed image in a time division manner.

Figure 9:
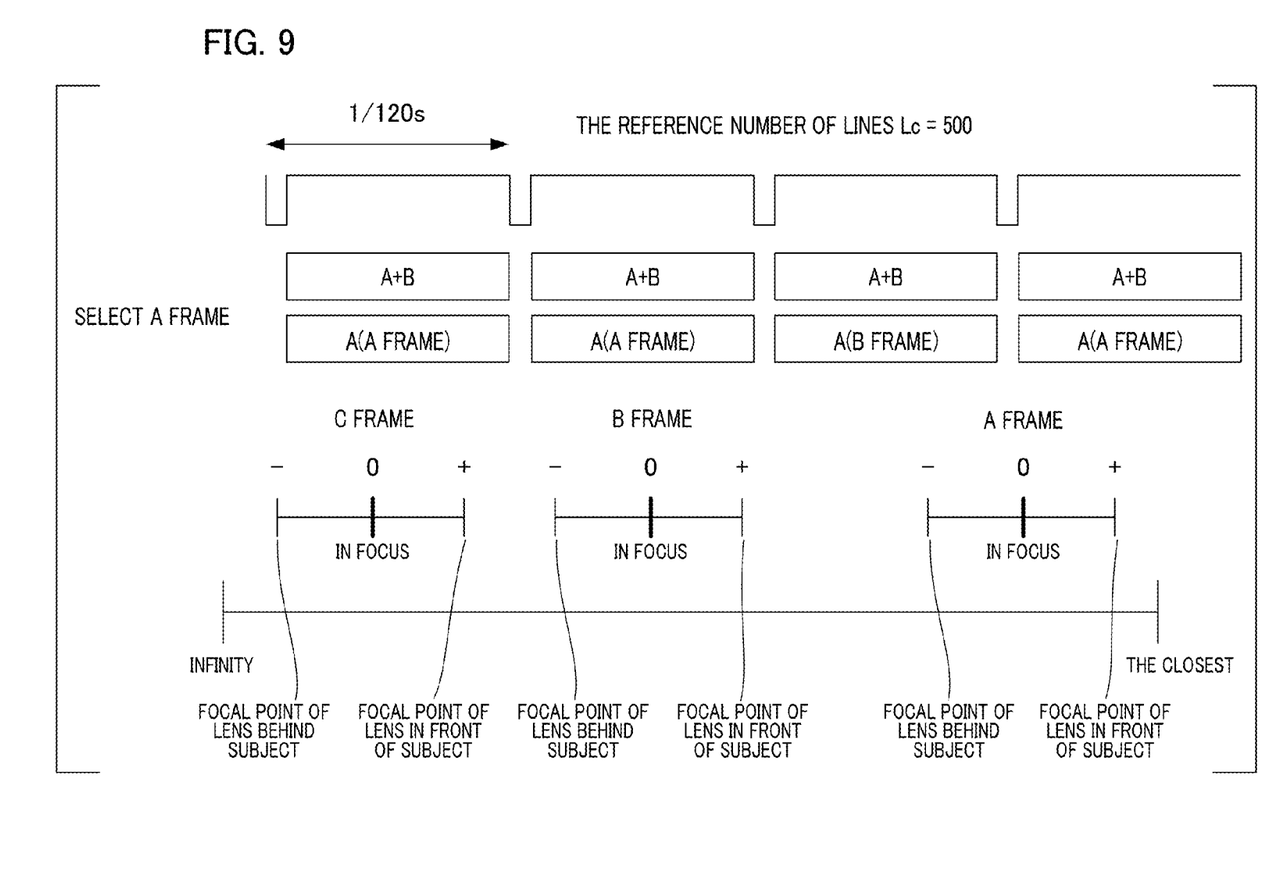
FIG. 9 is a diagram which describes a reading time division control of an image area for acquiring phase difference information in a second embodiment.

FIG. 9 is a diagram which describes a reading time division control of the image area for acquiring phase difference information in the second embodiment.

The reference number of lines Lc is set to 500 and described. The reference number of lines of an image area for acquiring phase difference information corresponding to each of three face detection frames shown in FIG. 4B is as follows.

Face detection frame A: 450
Face detection frame B: 220
Face detection frame C: 330

Since the reference number of lines Lc is 500, it is not possible to set an image area for acquiring phase difference information corresponding to all the face detection frames to a reading target area in one frame.

In an example shown in FIG. 9, if the face detection frame A of the three face detection frames is specified as a first selection frame, the CPU 7 sets the face detection frame B whose focal position is the closest to the face detection frame A as a second selection frame. A reading frame rate of the imaging element 2 is set to 120 fps (output images of 120 frames per second).

The CPU 7 sets reading of the first selection frame and the second selection frame in a time division manner. Specifically, the CPU 7 sets a reading time rate between the first selection frame and the second selection frame to 2:1. That is, the CPU 7 controls such that the second selection frame is read for one frame after reading the first selection frame for two frames. With respect to the reading frame rate of 120 fps of the imaging element 2, there is 80 fps for an image area for acquiring phase difference information corresponding to the face detection frame A, and 40 fps for an image area for acquiring phase difference information corresponding to the face detection frame B. As a result, even if a plurality of face detection frames are present in a subject photographic image and only an image area for acquiring phase difference information of one face detection frame can be read, it is possible to read an image area for acquiring phase difference information corresponding to the plurality of face detection frames. A reading time rate between the plurality of face detection frames may be set to an arbitrary value. In addition, the reading time rate may be changed according to a reading frame rate of an imaging device and the number of reading pixels of an imaging element.

In the present embodiment, the CPU 7 determines whether a plurality of subject areas can be selected in one frame on the basis of a result of comparing the number of vertical lines corresponding to a face detection frame and the reference number of lines. If a plurality of subject areas cannot be selected in one frame, the CPU 7 performs a control to read an image area for acquiring phase difference information corresponding to a face detection frame of a first subject and an image area for acquiring phase difference information corresponding to a face detection frame of a second subject in a time division manner. The CPU 7 sets a second frame rate to read a parallax image signal from the image area for acquiring phase difference information corresponding to the face detection frame of a second subject to be lower than a first frame rate to read a parallax image signal from the image area for acquiring phase difference information corresponding to the face detection frame of a first subject.

In addition, as a priority of the plurality of face detection frames, a priority set in advance may be used, and a priority of the face detection frames may be determined according to a user's specification. That is, the CPU 7 may set a main subject as a first subject and set a subject whose focal position is the closest to the main subject or a subject specified according to a user's operation as a second subject. According to the imaging device of the second embodiment, it is possible to prevent poor reading due to an excess of reading band of an imaging element.

Third Embodiment

In an imaging device of a third embodiment, a frame rate of a subject photographic image and a method of setting a threshold value of reading lines of an image for acquiring a phase difference at this time will be described with reference to FIG. 11.

Figure 11:
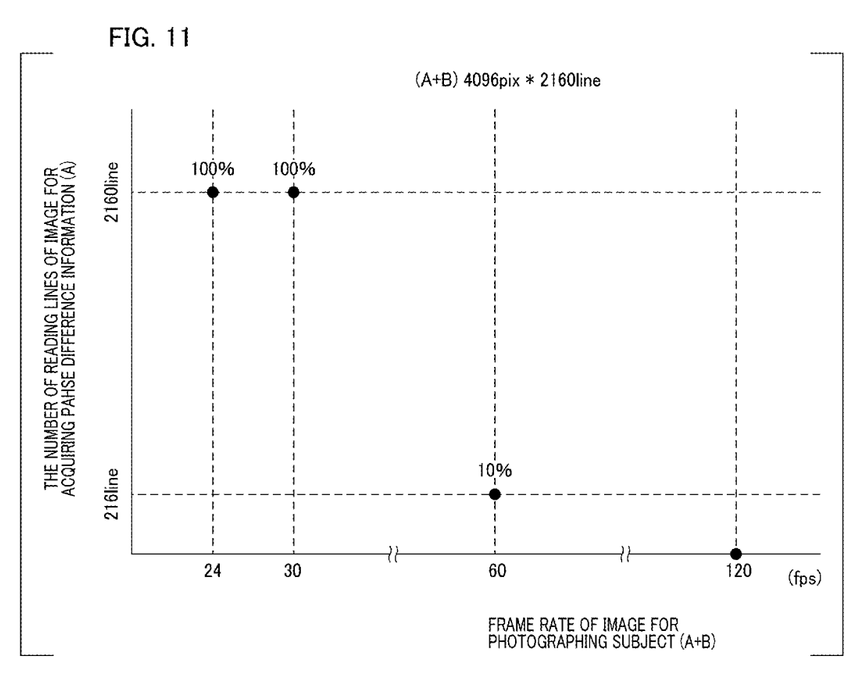
FIG. 11 is a diagram which describes a frame rate of a subject photographic image in a third embodiment and a threshold value of an image for acquiring phase difference information.

FIG. 11 shows a frame rate of a subject photographic image and a threshold value of reading lines of an image for acquiring phase difference information when the frame rate is selected.

Here, Equation (1) for calculating the threshold value is shown.

$$(H*LAB+H*LA)*F=X \quad (1)$$

The number of horizontal pixels of an image for photographing a subject (A+B) and an image for acquiring a phase difference (A): H The number of vertical lines of the image for photographing a subject (A+B): LAB The number of vertical lines of the image for acquiring a phase difference (A): LA A frame rate of the image for photographing a subject (A+B): F A maximum reading rate of an imaging element: X Since the calculation expression is set as described above, for example, if LAB is 2160 lines and X is 142560, if the frame rate F is 24 fps, LA is 3780, and if the frame rate F is 60 fps, LA is 216.

Therefore, since the number of vertical lines of the image for photographing a subject is 2160 lines, the total number of lines (2160 lines) if the frame rate is set to 24 fps or 216 lines which is 10% of the total number of lines if the frame rate is set to 60 fps is set as a threshold value of reading lines of the image for acquiring a phase difference.

As described above, it is possible to change a threshold value of the number of vertical lines corresponding to a reading area of the image for acquiring a phase difference according to a setting of a frame rate of the image for photographing a subject of an imaging device or a multiplied value of the number of horizontal pixels of the image for photographing a subject, that is, the number of pixels in one frame.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-099186, filed May 18, 2016, Japanese Patent Application No. 2017-036568, filed Feb. 28, 2017, which are hereby incorporated by reference wherein in their entirety.

What is claimed is:

1. An imaging device comprising:
an imaging element configured to include a plurality of pixels each including one microlens and multiple photoelectric converters and output an image pickup signal and a parallax image signal; and
a control unit configured to select one or more subject areas on the basis of the image pickup signal and to perform a control to read the parallax image signal from a reading area of the imaging element corresponding to each of the selected subject areas,
wherein the control unit selects a first subject area for the reading of the parallax image signals on the basis of a result of comparing the number of lines configuring the reading area corresponding to the first subject area and a threshold value, and
wherein the control unit further selects none, one or more additional subject areas for the reading of the parallax image signals on the basis of a result of comparing the total number of lines configuring the reading areas corresponding to the selected subject areas and the threshold value.

2. The imaging device according to claim 1, wherein, if there are a plurality of subject areas, the control unit does not select at least one subject area if the number of lines corresponding to the reading area for the plurality of subject areas exceeds the threshold value.

3. The imaging device according to claim 2,
wherein the control unit determines a priority on the basis of a focal position corresponding to a subject area and selects the subject area on the basis of the determined priority.

4. The imaging device according to claim 3,
wherein the control unit sets a subject area of a main subject to have a highest priority, sets a subject area of a subject whose focal position is closer to a focal position of the main subject to have a higher priority, and selects subject areas in a descending order of priority so that a total of the number of lines configuring the reading area corresponding to the selected subject areas does not exceed the threshold value.

5. The imaging device according to claim 1,
wherein the control unit directs performs a control to read a reading area corresponding to a subject area of a first subject and a reading area corresponding to a subject area of a second subject in a time division manner.

6. The imaging device according to claim 5, wherein the control unit determines whether a plurality of subject areas can be selected in one frame on the basis of a result of comparing the number of lines configuring the reading area corresponding to a subject area and a threshold value, and if a plurality of subject areas cannot be selected in one frame, the control unit performs a control to read the reading area corresponding to a subject area of a first subject and the reading area corresponding to a subject area of a second subject in a time division manner.

7. The imaging device according to claim 5, wherein the control unit sets a second frame rate to read the parallax image signal from the reading area corresponding to a subject area of a second subject to be lower than a first frame rate to read the parallax image signal from the reading area corresponding to a subject area of a first subject.

8. The imaging device according to claim 5, wherein the control unit sets a main subject as the first subject, and sets a subject whose focal position is the closest to a focal position of the main subject or a subject specified according to a user's operation as the second subject.

9. A method of controlling an imaging device which includes an imaging element that includes a plurality of pixels each including one microlens and multiple photoelectric converters for outputting an image pickup signal and a parallax image signal, the method comprising:
controlling which selects one or more subject area on the basis of the image pickup signal, and performs a control to read the parallax image signal from a reading area of the imaging element corresponding to each of the selected subject areas,
wherein the first subject area is selected for the reading of the parallax image signals on the basis of a result of comparing the number of lines configuring the reading area corresponding to the first subject area and a threshold value in the controlling, and
wherein none, one or more additional subject areas are selected for the reading of the parallax image signals on the basis of a result of comparing the total number of lines configuring the reading areas corresponding to the selected subject areas and the threshold value in the controlling.

* * * * *